United States Patent [19]
Gest

[11] 3,911,710
[45] Oct. 14, 1975

[54] METHOD AND APPARATUS FOR SMOOTHING THE INTERNAL BEAD IN TUBING

[75] Inventor: Therlow C. Gest, South Euclid, Ohio

[73] Assignee: Republic Steel Corporation, Cleveland, Ohio

[22] Filed: May 30, 1974

[21] Appl. No.: 474,524

[52] U.S. Cl. .................. 72/193; 72/192; 29/477.7; 90/24 B
[51] Int. Cl.² ........................................ B21D 31/06
[58] Field of Search ........ 29/477.7, 480, 481, 33 A; 90/24 B; 72/190, 191, 192, 193, 209

[56] References Cited
UNITED STATES PATENTS
3,494,165  2/1970  Preusch ................................ 72/193
3,625,042  12/1971  Sendzimir ............................ 72/189

Primary Examiner—Lowell A. Larson
Attorney, Agent, or Firm—Watts, Hoffmann, Fisher & Heinke Co.

[57] ABSTRACT

An hydraulically supported, resiliently mounted anvil engages one side of a tube as the tube passes along a feed path between the anvil and an oscillating roll. A barrel-shaped mandrel is positioned interiorly of the tube and is held by a cable at a location between the oscillating roll and the anvil. During each revolution of the oscillating roll, the tube is compressed between the roll and the anvil, and opposite tube walls are clamped against the mandrel to smooth the internal tube surface. The mandrel and the anvil are resiliently mounted to permit their moving a short distance downstream with the tube when the tube is compressed by the roll. The compressive forces applied to the tube are controlled by regulating the hydraulic pressure which supports the anvil.

22 Claims, 5 Drawing Figures

METHOD AND APPARATUS FOR SMOOTHING THE INTERNAL BEAD IN TUBING

BACKGROUND OF THE INVENTION

1. Field of the Invention

The present invention relates to an improved apparatus for smoothing the internal surface of a tube.

2. Prior Art

When welded tubing and pipe is manufactured, typically an inwardly projecting weld bead is formed along the longitudinal weld seam. A weld bead formed with present day continuous welding techniques usually projects inwardly about 0.005 inch and can project inwardly as much as 0.015 inch depending on the type of welding process used. The inwardly projecting bead should be flattened or removed if the tube is to have an acceptably smooth surface.

A number of methods and apparatus have been proposed for removing the interior weld bead from tubing and pipe. One proposed apparatus includes a barrel-shaped plug which is drawn through newly welded tubing. The plug is held by a cable at a location where the tube passes between a pair of rolls. The upper roll is mounted for free rotation on an eccentric. The eccentric causes the roll to oscillate rapidly to repetitively compress the tubing. The lower roll is concentrically mounted and engages the underside of the conduit to support it as the conduit is repetitively compressed by the oscillating upper roll. The plug travels with the tubing against the action of a spring when the rolls compress the tube. When the compressive force applied by the rolls is released, the spring biases the plug to a return position.

One problem with the described apparatus is that the relatively small area of supporting engagement between the lower roll and the tube is not always sufficient to prevent distortion of the tube wall. Another problem with such proposed apparatus is that it includes a load cell and "screwdown adjustment" system to position the upper roll. Such a system will not perform as well as described to regulate the compressive pressure applied to the tube and to assure that this pressure does not exceed maximum desired limits. For example, relatively small variations in tube wall thickness can cause large variations in the compressive forces applied to the tube, the plug, and the rolls. If excessive pressures are generated, damage can result both to the bead flattening apparatus and to the tube.

The compressive forces which should be applied to welded tubing to effect smooth flattening of the internal weld bead differ depending on tube size, the material from which the tube is formed, the size of the weld bead, etc. Mechanical adjustment of the oscillating roll position makes precise pressure control quite difficult even where tube wall thickness is uniform. Moreover, a mechanically adjusted system cannot respond quickly to pressure variations caused by variations in tube wall thickness or the like.

SUMMARY OF THE INVENTION

The present invention overcomes the foregoing and other drawbacks of the prior art and provides an improved weld bead flattening system which utilizes a fluid pressure supported, resiliently mounted anvil for supporting a tube as it is repetitively compressively engaged by an oscillating mechanism such as an eccentrically mounted roll.

The present invention utilizes an eccentrically mounted roll and a cable supported mandrel which are similar to the described prior proposal. The mounting of the eccentric roll is greatly simplified in that the load cells and "screwdown adjustment" system are eliminated.

An anvil formed from a block of hardened steel is provided beneath the eccentric roll. The anvil has a longitudinally extending groove of arcuate cross section which receives and supports a welded tube as it passes between the anvil and the eccentric roll. The anvil is resiliently mounted for movement longitudinally downstream with the traveling tube a short distance when the tube is compressed. The anvil is biased toward a centered position beneath the eccentric roll and returns to its centered position when the compressive force applied to the tube by the eccentric roll is released. Tests have shown that this type of resiliently mounted anvil will prevent tube wall distortion and will perform well over long periods of use. The anvil is simpler in construction and easier to service than the larger, more complex supporting roll of the described proposal.

The anvil is fluid-pressure supported. The anvil is carried by a piston which is extensible and retractible to raise and lower the anvil short distances. By controlling the fluid pressure supplied to the piston, the compressive forces applied to the tubing can be rapidly adjusted and accurately regulated. The fluid pressure anvil support system optimizes bead flattening performance.

Another advantage of the fluid pressure supported anvil is the immediacy with which increasing compressive forces can be sensed and relieved to prevent damage to the apparatus or the tubing.

The system of the present invention reacts almost instantaneously to force increases from such causes as variations in the wall thickness to prevent the generation of forces which might cause damage. Increased compressive forces are almost instantaneously reflected in increased fluid pressures in the anvil support system. Pressure relief controls incorporated in the system relieve the compressive forces before they can build to dangerous magnitudes.

The simplicity and small size of the movable anvil permits the fluid pressure support system to be equally simple and small. These simplified constructions are a considerable improvement over the far more complex and less responsive load cell system previously proposed.

The preferred anvil support fluid is hydraulic oil which is pressurized by means of a conventional air-oil intensifier supplied with compressed air. The compressibility of air supply permits the anvil to move rapidly to reduce building forces even before the supporting air pressure is released by pressure relief controls.

A general object of the present invention is to provide an improved system for smoothing the internal weld bead in longitudinally welded tubing and pipe.

Other objects and a fuller understanding of the invention may be had by referring to the following description and claims taken in conjunction with the accompanying drawings.

DESCRIPTION OF THE PREFERRED EMBODIMENT

Figure 1:
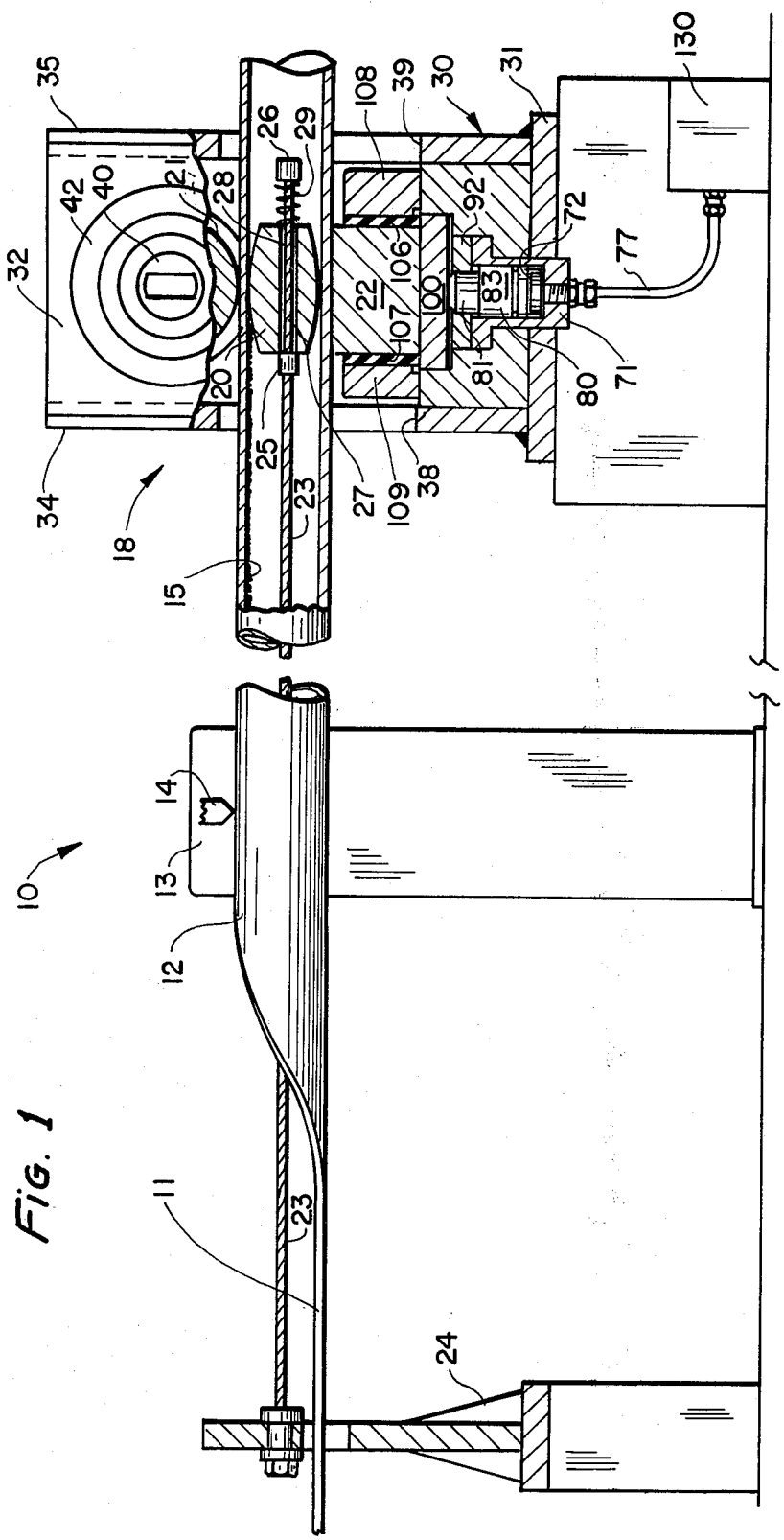
FIG. 1 is a partially diagrammatic elevational view of a pipe welding line including the improved apparatus of the present invention with portions broken away.

Referring to FIG. 1, a pipe welding line including the weld bead smoothing apparatus of the present invention is shown schematically at 10. Flat strip or skelp 11 is conventionally formed by a series of rolls (not shown) into a continuous tube 12. The tube 12 has a longitudinal seam which is welded at a weld stand 13 by an electrode indicated schematically at 14. The tube 12 is then shaped by a series of finishing rolls (not shown) to a round outer configuration.

The welded tube 12 has a weld bead 15 which extends inwardly and must be flattened or removed before the tube will meet commercial standards. In accordance with the present invention, the internal weld bead 15 is flattened in an apparatus indicated generally by the numeral 18.

The bead smoothing apparatus 18 includes a barrel-shaped mandrel 20 positioned internally of the tube 12 at a location where the tube 12 passes between a roll 21 and an anvil block 22. The mandrel 20, the roll 21, and the anvil block 22 cooperate to flatten the internal weld band 15, leaving the interior pipe wall smooth and round.

The mandrel 20 is held in position by a cable 23. The left end region of the cable 23, as viewed in FIG. 1, is connected to a stationary upstanding support 24. The right end region of the cable 23 carries a pair of stops 25, 26 spaced one from the other by a cable reach 27. A centrally located bore 28 extends through the mandrel 20. The cable reach 27 extends through the bore 28 mounting the mandrel 20 for movement between the stops 25, 26.

The stop 25 is positioned such that when the mandrel 20 engages it the mandrel 20 is centered beneath the roll 21. The stop 26 is positioned rightwardly of the stop 25, as viewed in FIG. 1, at a location which will permit the mandrel 20 to move a short distance downstream with the tube 12.

A compression coil spring 29 biases the mandrel 20 toward the stop 25. The coil spring 29 is carried on the cable reach 27 with one end engaging the mandrel 20 and the other end engaging the stop 26. The spring 29 biases the mandrel 20 toward engagement with the stop 25. Rightward movement of the mandrel 20 compresses the spring 29 increasing the biasing force with which the mandrel 20 is urged toward the stop 25.

Figure 2:
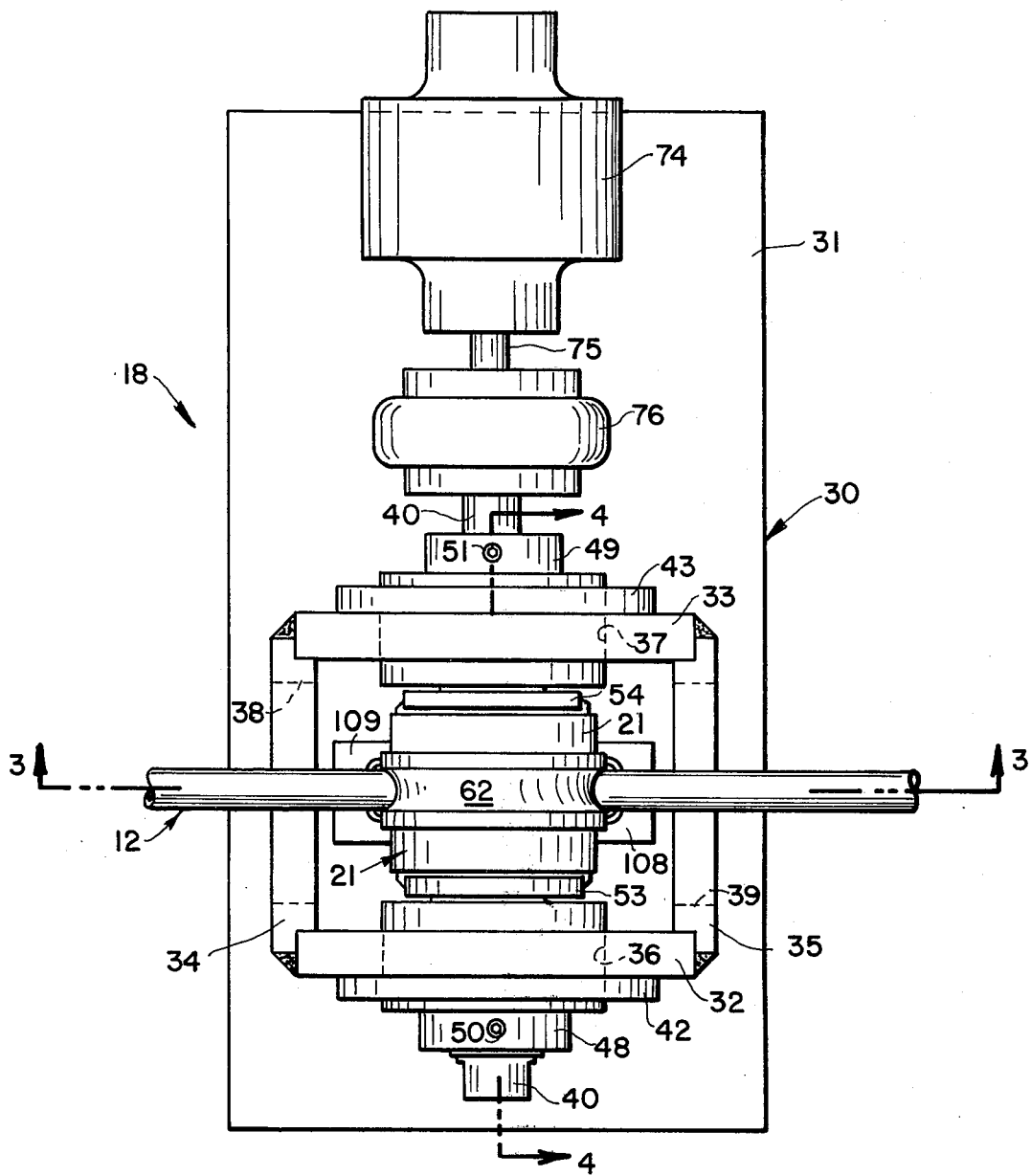
FIG. 2 is an enlarged top plan view of a portion of the apparatus of FIG. 1.

Referring to FIG. 2 in particular, a welded base structure is shown generally at 30. The base structure 30 supports the roll 21 and the mandrel 20. The base structure 30 has a base plate 31. Four upstanding plates 32, 33, 34, 35 are welded together to form an upstanding box-like support. The plates 32-35 are supported on and welded to the base plate 31.

The plate 32 is a front plate, and the plate 33 is a rear plate. These plates 32, 33 are provided with axially aligned holes 36, 37. Bearing blocks 42, 43 are carried in the holes 36, 37.

The plates 34, 35 are side plates. The side plates 34, 35 are provided with aligned openings 38, 39. The tube 12 passes through the openings 38, 39.

Figure 4:
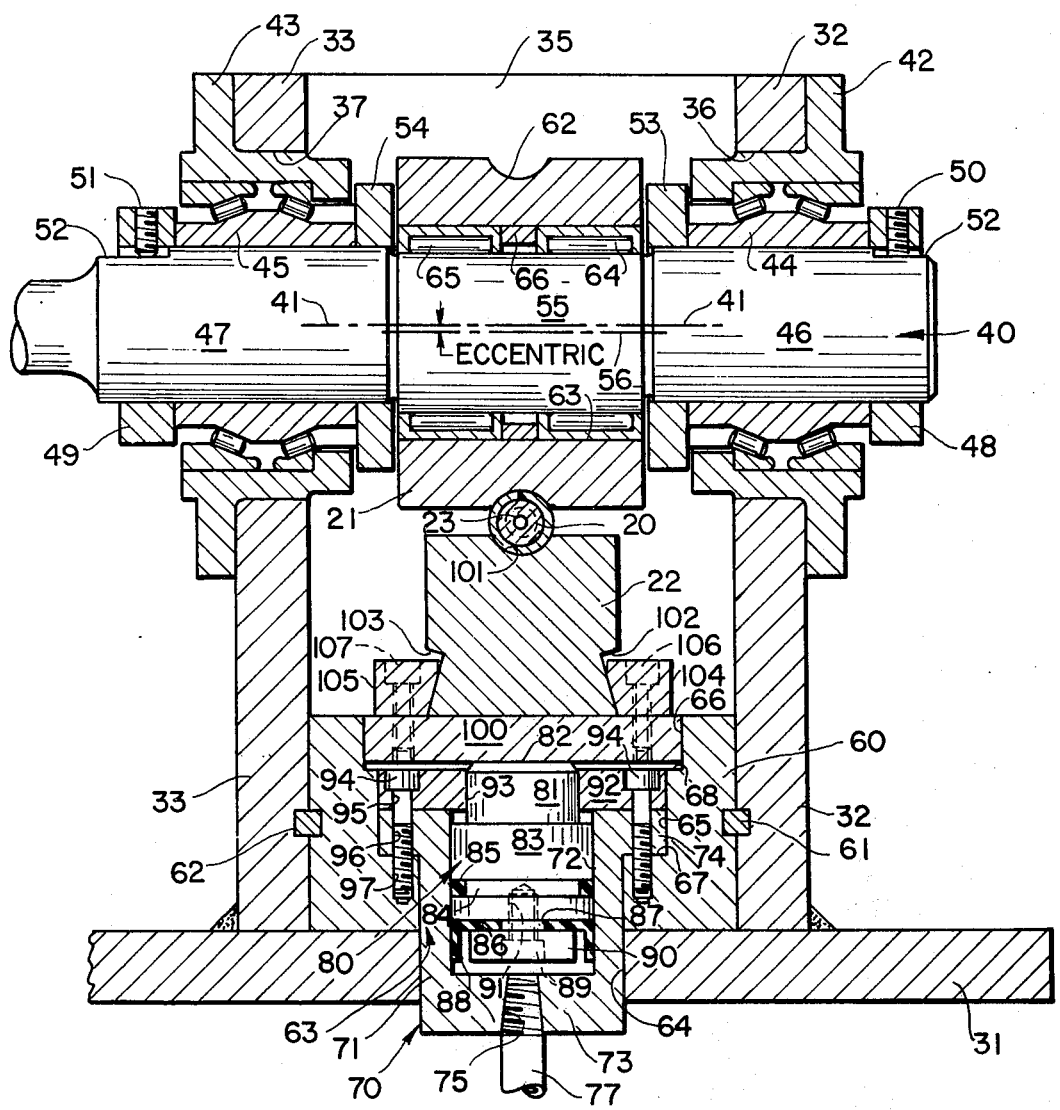

A shaft 40 is journaled by the bearing blocks 42, 43. Referring to FIG. 4, roller bearings 44, 45 are carried in the bearing blocks 42, 43. The shaft 40 has two spaced cylindrical regions 46, 47 which are journaled by the bearings 44, 45. The regions 46, 47 are coaxial and have a centerline indicated by the numeral 41. Locking collars 48, 49 are carried on the outer end portions of the regions 46, 47. Set screws 50, 51 carried in threaded apertures in the locking collars 48, 49 extend into engagement with flats 52, 53 formed in the shaft regions 46, 47 to hold the locking collars 48, 49 in place. A pair of annular spacers 53, 54 are carried on the inner end portions of the regions 46, 47.

An eccentric cylindrical region 55 is formed on the shaft 40. The eccentric region 55 extends between the spacers 53, 54 and has a centerline indicated by the numeral 56. The eccentricity of the centerline 56 relative to the centerline 41 is typically about 0.032 inches where the tube 12 has an inner diameter of about 1 inch or less.

The roll 21 is rotatably carried on the eccentric region 55. The roll 21 has a central bore 63. A pair of roller bearings 64, 65 separated by an annular spacer 66 are carried in the bore 63. The bearings 65, 66 engage the eccentric region 55 and journal the roll 21 for rotation on the eccentric region 55.

An arcuate groove 62 is formed in the outer surface of the roll 21. The groove 62 has a radius which corresponds to the outer wall diameter of the tube 12. Upper portions of the outer wall of the tube 12 are received in the groove 62 as the tube 12 passes between the roll 21 and the anvil 22. Frictional engagement between the roll 21 and the tube 12 causes the roll 21 to rotate in the direction of arrow 70.

Figure 3:
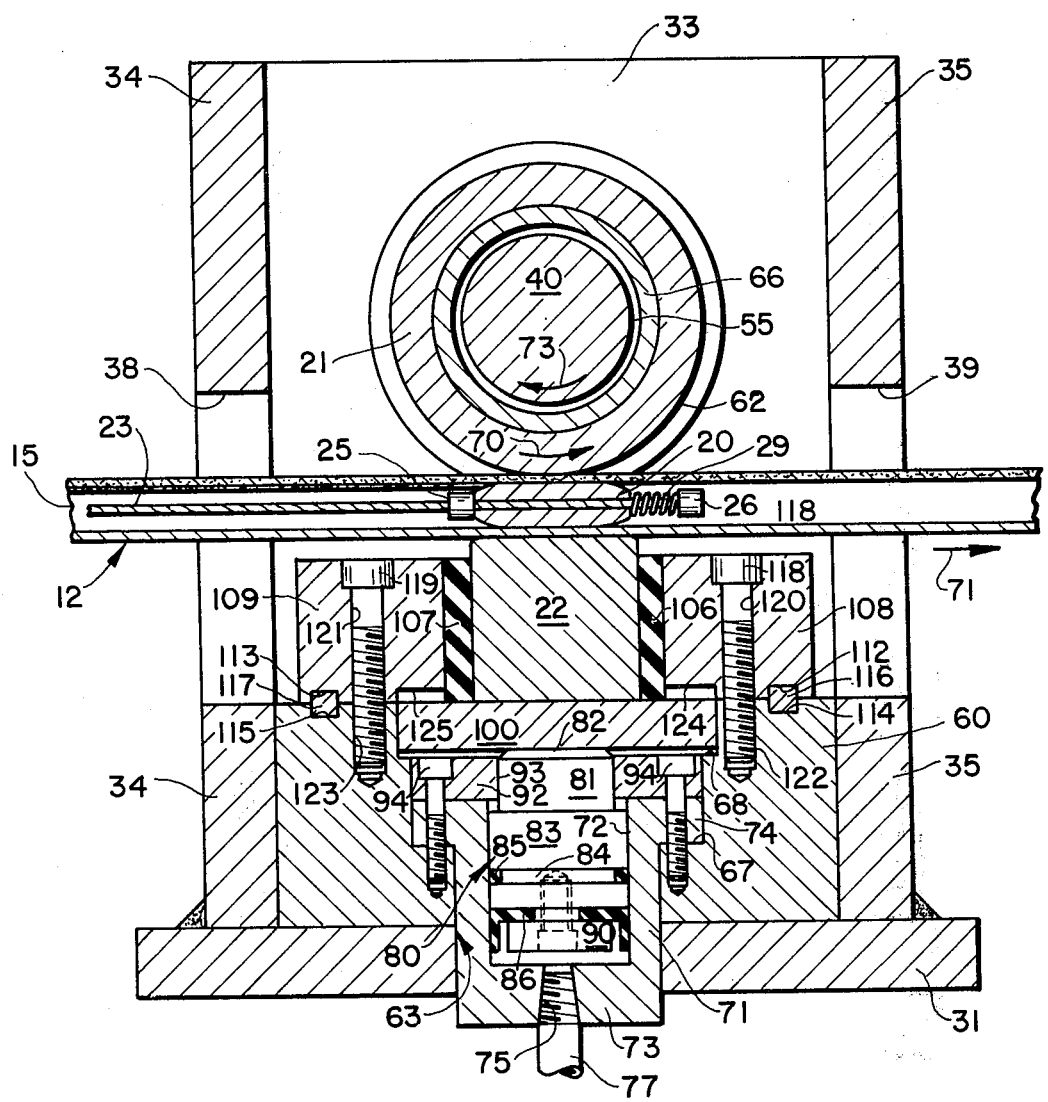
FIGS. 3 and 4 are enlarged sectional views as seen from planes indicated by the lines 3—3 and 4—4 in FIG. 2; and, FIG. 5 is an enlarged exploded view showing the relationship between several parts of the apparatus.

The shaft 40 is driven in the opposite direction of rotation, as indicated by the arrow 73 in FIG. 3. Referring to FIG. 2, a motor 74 is carried near one end of the base plate 31. The motor 74 has an output shaft 75 which rotates in the direction of arrow 73. A flexible coupling 76 drivingly connects the motor output shaft 75 to the shaft 40.

The speed of the motor output shaft 75 is controlled in accordance with the velocity of the tube 12. With tube feed rates in the range of about 1.5 to 12 feet per minute, the motor speed is typically selected within the range of about 400 to 2000 revolutions per minute. With each revolution of the shaft 40, the roll 21 is oscillated into and out of compressive engagement with the tube 12.

A rectangular mounting block 60 is positioned atop the base plate 31 and extends into engagement with the inner walls of the upstanding plates 32-35. A pair of square keys 61, 62, FIG. 4, are received in aligned keyways formed in the front and rear plates 32, 33 and the mounting block 60 to hold the mounting block 60 rigidly in place.

A stepped bore 63 extends through the mounting block 60 and through the base plate 31. The bore 63 includes a lower portion 64 of a first diameter provided through the base plate 31 and through the lower region of the mounting block 60; an intermediate region 65 of larger diameter extending through the central portion of the mounting block 60; and an upper region 66 of still larger diameter extending through the upper portion of the mounting block 60. An annular shoulder 67 separates the lower and intermediate regions 64, 65. An annular shoulder 68 separates the intermediate and upper regions 65, 66.

A hydraulic cylinder 70 is carried in portions of the lower and intermediate regions 64, 65. The cylindrical 70 includes a cylindrical housing 71 having a bore 72 closed at its lower end by a bottom wall 73. An annular flange 74 extends around the upper end region of the housing 71 and engages the shoulder 67. A threaded aperture 75 is formed through the bottom wall 73 to receive the threaded end of a hydraulic conduit 77.

A piston 80 is carried in the bore 72. The piston has a reduced diameter upper end region 81 which extends out of the bore 72 and which terminates in a rounded end 82. An enlarged diameter lower end region 83 is slidably received in the bore 72. A perimetrical groove 84 is formed in the lower region 83. A resilient annular seal 85 is carried in the groove 84. Another resilient annular seal 86 is positioned beneath the piston 80. The seal 86 has a central aperture 87 and an outer lip 88 which extends axially of the bore 72. A cap screw 89 extends through a washer 90, through the central aperture 87 of the seal 86, and is received in a threaded aperture 91 in the lower region 83 of the piston 80. When the cap screw 89 is tightened in place, it clamps the seal 86 between the washer 90 and the piston 80.

An annular plate 92 extends around the upper region 81 of the piston 80. The plate 92 has a central bore 93 which slidably receives the upper region 81. The periphery of the plate 92 extends into engagement with the intermediate region 65 of the bore 63. Cap screws 94 extend through aligned apertures 95, 96 in the plate 92 and the flange 74, and into threaded apertures 97 in the mounting block 60. Portions of the plate 92 overlie the upper end of the bore 72 and serve as a stop to limit the upward travel of the piston 80.

A circular plate 100 is slidably carried in the upper region 66 of the bore 63. When the piston 80 is in its lowermost position, the plate 100 rests atop the shoulder 68. When the piston 80 is elevated such that its upper end 82 projects out of the bore 93, the circular plate 100 is supported by the piston and is movable therewith to raise and lower the anvil 22.

Figure 5:
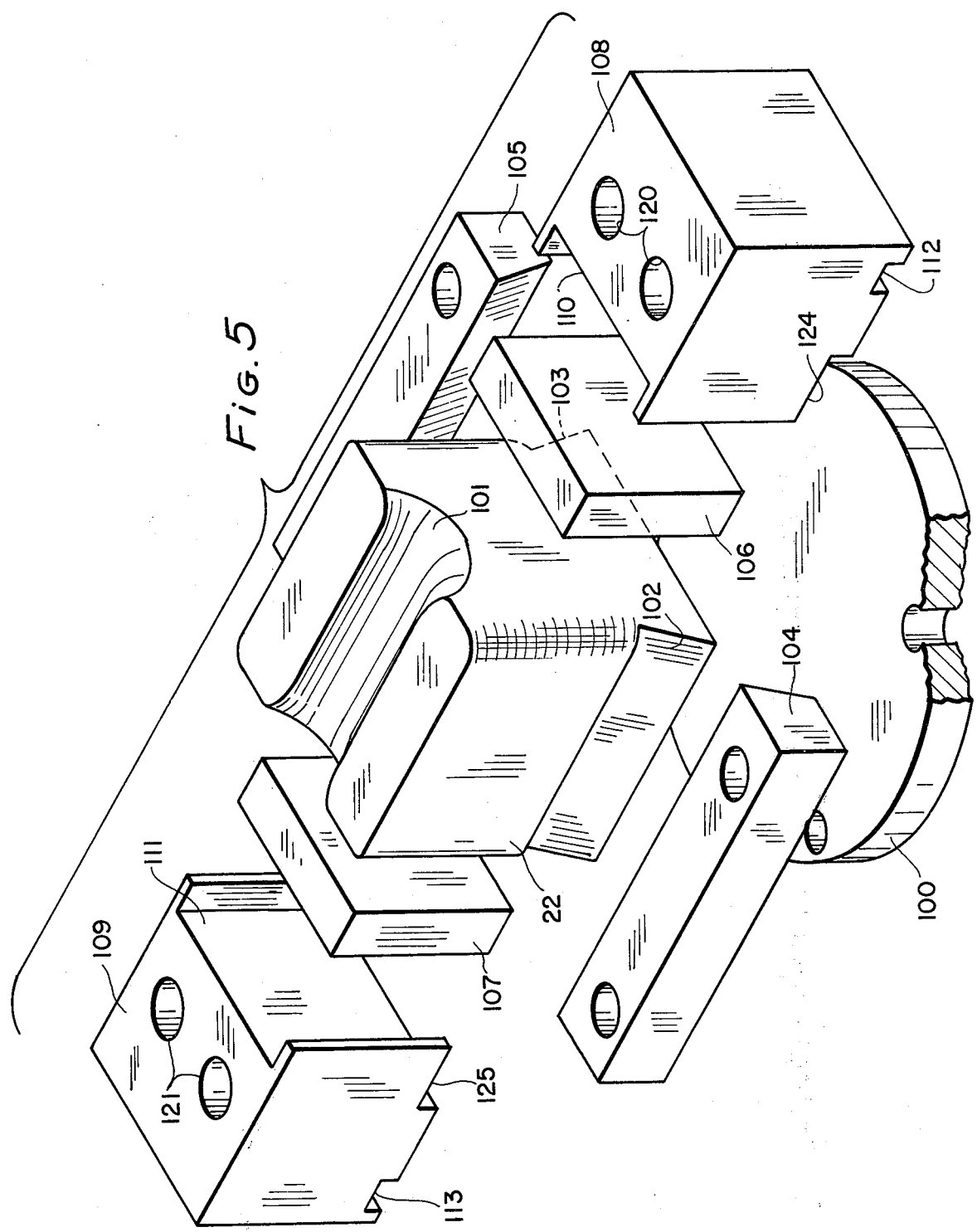

The anvil 22 is movably carried atop the circular plate 100. Referring to FIG. 5 in conjunction with FIGS. 3 and 4, V-shaped grooves 102, 103 extend along opposite sides of the anvil 22. The bottom surface of the anvil 22 rests atop the circular plate 100. A pair of guide members 104, 105 are secured to the circular plate 100 by cap screws 106, 107. The guide members 104, 105 extend into the grooves 102, 103 and slidably receive the mandrel 22, constraining its movement to directions paralleling the movement of the tube 12.

Elastomeric spacers 106, 107 engage opposite ends of the anvil 22 and bias the anvil to a central position beneath the roll 21. The spacers 106, 107 may be formed from a number of elastomeric materials including rubber. Rubber having a hardness of about 90 durometers has been used successfully to form the spacers 106, 107. The spacer 106 is located on the downstream end of the anvil 22 and serves to bias the anvil toward its centered position beneath the roll 21 when the anvil 22 has moved downstream a short distance with the tube 12. The spacer 107 is located on the upstream end of the anvil 22 and serves to cushion the return of the anvil 22 to its centered position.

A pair of stop blocks 108, 109 are carried atop the mounting block 60 and hold the spacers 106, 107 in position adjacent the anvil 22. The stop blocks have grooved end walls 110, 111 which receive the spacers 106, 107. Keyways 112, 113 are formed in the bottom surfaces of the stop blocks 108, 109. Coacting keyways 114, 115 formed in the mounting block 60 receive keys 116, 117 to position the stop blocks 108, 109 relative to the mounting block 60. Cap screws 118, 119 extend through apertures 120, 121 in the stop blocks 108, 109 and into threaded apertures 122, 123 in the mounting block 60 to hold the stop blocks 108, 109 in position.

Notches 124, 125 are formed in the bottom surface of the stop blocks to permit the circular plate 100 to project upwardly beyond the top of the mounting block 60 as the piston 80 extends.

Hydraulic oil is supplied through the conduit 77 from a source indicated generally by the numeral 130 in FIG. 1. The source 130 can be any conventional air-oil intensifier which, when supplied with pressurized air, is capable of supplying hydraulic oil under pressures within the range of about 100 to 1000 psi. The hydraulic oil supplied through the conduit 77 enters the bore 72 in the region below the piston 80, and exerts an upward force on the piston 80 which is proportional in magnitude to the pressure of the hydraulic oil.

The source 130 is preferably capable of delivering any desired pressure within the range of 100 to 1000 psi as widely different pressures are needed to accommodate tubes 12 which are of different hardnesses and materials, and which have different size weld beads 15. The source 130 also preferably includes conventional pressure relief devices which can be preset to relieve the pressure within the conduit 77 if it rises above a predetermined limit which might result in damage either to the apparatus 18 or the tube 12.

In operation, the shaft 40 is rotated by the motor 74 at a speed selected to provide an adequate number of oscillations of the roll 21 on each increment of the tube 12 as the tube passes between the roll 21 and the anvil 22. In the production of stainless steel tubing having an internal diameter of one inch or less, tube feed rates of about four to five per minute are used together with roll speeds which provide about 100 to 1500 oscillations per minute. Higher tube feed rates typically require higher roll speeds to provide the needed number of oscillations per tube increment.

When the shaft 40 rotates to a position where the eccentric region 55 forces the roll 21 into compressive engagement with the tube 12, the tube 12 is compressed into firm engagement with the anvil 22, and the mandrel 20 is squeezed by the tube wall. During this brief period of time of compressive engagement, the mandrel 20 and the anvil 22 move a short distance (typically about one-sixteenth) downstream with the tube 12.

As the shaft 40 rotates to a position where the eccentric region 55 releases the compressive engagement between the roll 21 and the tube 12, the tube walls spring back into roundness. The mandrel 20 and the anvil 22 then return under the biasing action of the spring 29 and the elastomeric spacer 106 to their centered positions beneath the roll 21.

The repeated oscillations of the roll 21 cause the internal weld bead 15 to be compressed against the mandrel 20 and flattened to an acceptable smooth condition. Relatively thick weld beads formed in tubes of relatively hard material require that the anvil 22 be supported by hydraulic pressures of relatively large magnitude supplied to the bore 72 beneath the piston 80. Thinner weld beads in softer tubes require less anvil support pressure.

As will be apparent from the foregoing desciption, the present invention provides, among other things, an improved and extremely simple system for supporting a tube beneath an oscillating roll and for controlling the compressive forces which are applied to the tube by the oscillating roll.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. An apparatus for smoothing internal surfaces of a tube, comprising:
   a. a support;
   b. an anvil movably carried by said support;
   c. oscillating means mounted in spaced relationship with the anvil, said oscillating means and said anvil being movable relatively toward and away from each other for repetitively compressively engaging opposed side regions of a tube as such tube moves along a path between said oscillating means and said anvil;
   d. said anvil defining a tube engaging surface portion extending longitudinally of said path which is in engagement with one side region of such tube when an internal surface of such tube is being smoothed;
   e. a mandrel for positioning interiorally of such tube at a location along said path between said oscillating means and said anvil, said mandrel being operable to engage and smooth internal surfaces within such tube; and
   f. fluid pressure means interposed between said anvil and said support for supporting and positioning said anvil in directions toward and away from said oscillating means to control the magnitude of the compressive forces applied to such tube by said oscillating means.

2. The apparatus of claim 1 additionally including:
   a. mounting means mounting said anvil for movement along said path a limited distance between a first position and a second position downstream in the direction of travel of such tube from said first position; and
   b. biasing means biasing said anvil away from said second position toward said first position.

3. The apparatus of claim 2 wherein said mounting means includes a pair of guide members slidably engaging opposite sides of said anvil.

4. The apparatus of claim 2 wherein said biasing means includes an elastomeric member interposed between said anvil and said support.

5. An apparatus for smoothing the internal weld bead in longitudinally welded tubing, comprising:
   a. a support;
   b. an anvil movably carried by said support;
   c. oscillating means movably carried near said anvil for repetitively compressively engaging one side region of a welded tube as such tube passes along a path between said oscillating means and said anvil;
   d. a tube engaging surface defined on said anvil extending longitudinally of said path and having a cross section for engaging such tube along a side region opposite said one side;
   e. a mandrel for positioning interiorally of such tube at a location along said path between said oscillating means and said anvil, said mandrel being operable to engage the internal weld bead within the tube and smooth it as such tube passes between said anvil and said oscillating means;
   f. mounting means mounting said anvil on said support for movement along said path between a first position and a second position downstream in the direction of travel of such tube from said first position, and for movement toward and away from said oscillating means;
   g. biasing means for biasing said anvil away from said second position toward said first position; and
   h. fluid pressure means interposed between said anvil and said support for supporting and positioning said anvil in directions toward and away from said oscillating means to control the magnitude of the compressive forces applied to such tube by said oscillating means.

6. The apparatus of claim 5 wherein said fluid pressure means includes a piston which is extensible and retractible in directions toward and away from said oscillating means for moving said anvil.

7. The apparatus of claim 6 wherein said fluid pressure means includes a source of pressurized fluid for supplying fluid under controlled pressure to said piston, and pressure relief means to prevent said pressure from exceeding a predetermined value.

8. The apparatus of claim 5 wherein said first biasing means includes a resilient member interposed between said anvil and said support.

9. The apparatus of claim 8 wherein said mounting means includes a pair of guide members slidably engaging opposite sides of said anvil.

10. An apparatus for smoothing the internal weld bead in longitudinally welded tubing, comprising:
    a. an upstanding support structure;
    b. an anvil movably carried by said support structure;
    c. an oscillating roll carried by said support structure at a position spaced above said anvil for engaging the top side of a welded tube as the tube passes along a path between said roll and said anvil;
    d. an upwardly facing tube engaging surface defined on said anvil extending longitudinally of said path and having an arcuate cross section configured to engage the tube along a bottom side region thereof as the tube passes along said path;
    e. eccentric drive means mounting said roll on said support structure for oscillating movement toward and away from said anvil to repetitively compressively engage the tube as it passes along said path;
    f. mandrel means for positioning interiorally of the tube at a location between said roll and said anvil and being operable to engage the internal weld bead within the tube and smooth it as the tube passes between said roll and said anvil; and, g. fluid pressure means including a piston movably carried by said support at a position beneath said anvil and being movable in directions toward and away from said roll for supporting and positioning said anvil in directions toward and away from said roll to control the magnitude of the compressive forces applied to the tube by said roll.

11. The apparatus of claim 10 wherein:
a. said anvil is carried on a plate;
b. said plate is movably carried by said support for movement in directions toward and away from said roll;
c. said piston is connected to said plate to move said plate and concurrently position said anvil in directions toward and away from said roll.

12. The apparatus of claim 11 wherein:
a. said anvil is movably carried on said plate for movement in directions paralleling said path between a first position and a second position downstream in the direction of travel of the tube from said first position; and
b. a biasing means is provided for biasing said anvil away from said second position toward said first position.

13. The apparatus of claim 12 wherein:
a. said biasing means is interposed between one end region of said anvil and said support; and
b. a second biasing means is interposed between the opposite end of said anvil and said support to cushion the return of said anvil from said second position to said first position.

14. The apparatus of claim 10 wherein said fluid pressure means includes a source of pressurized fluid for supplying fluid under controlled pressure to said piston, and pressure relief means to prevent said pressure from exceeding a predetermined valve.

15. A method of smoothing internal surfaces of a tube, comprising the steps of:
a. drawing a mandrel through the tube by effecting relative movement between such tube and the mandrel, the location of said mandrel defining a work station;
b. repetitively compressively engaging opposite side regions of such tube at said work station by relatively moving first and second members positioned on opposite sides of such tube toward and away from each other; and,
c. supporting one of said members by fluid pressure during said repetitive compressive engagement of such tube to prevent forces applied to such tube by said members from exceeding a predetermined limit.

16. The method of claim 15 wherein said one member is an anvil having a surface configured to engage a longitudinally extending side region on such tube, and additionally including the steps of moving said anvil relative to said mandrel with such tube when such tube is compressively engaged, and returning said anvil to a return position between successive compressive engagements.

17. The method of claim 16 wherein said anvil is resiliently biased toward said return position by a biasing means, and the step of returning said anvil to said return position is effected by the action of said biasing means.

18. An apparatus for smoothing internal surfaces of a tube, comprising:
a. feeding means for moving a tube longitudinally along a feed path through a work station;
b. an anvil at the work station and having a tube support surface extending longitudinally of the feed path for engaging one side region of a tube being fed through the work station;
c. oscillating means at the work station and being movable toward and away from said anvil for repetitively compressively engaging the opposite side region of such tube as the tube is fed through the work station;
d. a mandrel for positioning interiorly of such tube between said anvil and said oscillating means at the work station; and,
e. support means supporting said anvil for movement toward and away from said oscillating means for retaining the axis of such tube substantially along a predetermined line when the compressive forces being applied to such tube are below a predetermined limit.

19. The apparatus of claim 18 wherein said support means includes mounting means mounting said anvil for movement along said path a limited distance between a first position and a second position downstream in the direction of travel of such tube from said first position, and biasing means biasing said anvil away from said second position toward said first position.

20. The apparatus of claim 19 wherein said mounting means includes a stop structure positioned downstream from said anvil, and said biasing means includes an elastomeric element interposed between said stop structure and said anvil.

21. The apparatus of claim 18 wherein said support means includes a support and a fluid pressure means interposed between said support and said anvil for supporting said anvil to retain the axis of such tube substantially along said predetermined line when the compressive forces applied to such tube are below a predetermined limit.

22. The apparatus of claim 21 wherein said fluid pressure means includes pressure relief means for rapidly relieving the pressure within said fluid pressure means when the compressive forces applied to such tube exceed said predetermined limit.

* * * * *